(12) United States Patent
Zan et al.

(10) Patent No.: US 11,831,746 B2
(45) Date of Patent: Nov. 28, 2023

(54) TIME CONSISTENCY SYNCHRONIZATION METHOD FOR DISTRIBUTED SIMULATION

(71) Applicant: HARBIN ENGINEERING UNIVERSITY, Haerbin (CN)

(72) Inventors: Yingfei Zan, Haerbin (CN); Lihao Yuan, Haerbin (CN); Shenghua Zhong, Haerbin (CN); Duanfeng Han, Haerbin (CN); Haitao Zhu, Haerbin (CN)

(73) Assignee: HARBIN ENGINEERING UNIVERSITY, Haerbin (CN)

(*) Notice: Subject to any disclaimer, the term of this patent is extended or adjusted under 35 U.S.C. 154(b) by 372 days.

(21) Appl. No.: 17/444,901

(22) Filed: Aug. 11, 2021

(65) Prior Publication Data
US 2021/0376994 A1    Dec. 2, 2021

Related U.S. Application Data

(63) Continuation of application No. PCT/CN2021/071974, filed on Jan. 15, 2021.

(51) Int. Cl.
*H04L 7/00* (2006.01)

(52) U.S. Cl.
CPC .................. *H04L 7/0012* (2013.01)

(58) Field of Classification Search
None
See application file for complete search history.

(56) References Cited

U.S. PATENT DOCUMENTS

| 2012/0084062 | A1* | 4/2012 | Maturana | G06F 30/33 703/6 |
| 2014/0214393 | A1* | 7/2014 | Kim | G06F 30/20 703/13 |
| 2016/0285576 | A1* | 9/2016 | Kim | H04J 3/0673 |
| 2016/0359610 | A1* | 12/2016 | Karthik | H04L 7/0008 |

* cited by examiner

*Primary Examiner* — Diane L Lo
(74) *Attorney, Agent, or Firm* — CBM PATENT CONSULTING, LLC (57) ABSTRACT

The invention belongs to the technical field of time synchronization of computer co-simulation, and particularly relates to a time consistency synchronization method for distributed simulation. According to the time consistency synchronization method, a most appropriate master clock is selected according to votes, and then the other clocks in a network are controlled to synchronize by using the master clock, so that the consistency of data of each node and a time-related event in time logic is ensured. Even if a certain simulation node goes down, influences on the other links of the whole system are relatively small, which can effectively perform decentration, ensure the time consistency to the greatest extent, and ensure the correctness and the scale of a whole distributed system.

9 Claims, 5 Drawing Sheets

TIME CONSISTENCY SYNCHRONIZATION METHOD FOR DISTRIBUTED SIMULATION

TECHNICAL FIELD

The invention relates to a time synchronization algorithm for computer collaborative simulation, and more particularly, to a time synchronization method for simulation by a plurality of physically isolated computers.

BACKGROUND

A distributed simulation system has gradually become an important means of evaluation and testing due to the features of low cost, repeatability, and non-destruction. The distributed simulation system has been developed rapidly in high-end fields such as shipping, aerospace, oil and gas exploitation, and large-scale equipment installation. In the distributed simulation system, a plurality of computers distributed in different positions complete a simulation task together. All the computers communicate with each other and implement data interaction through a computer network. Since all nodes are distributed in different geographical positions, how to ensure a time logic consistency of data and time-related events of each node is a key problem to be solved in a distributed virtual experiment system.

The design of the time synchronization method in the prior art has the following problems and defects: time synchronization is performed in a server/client manner; if the server is down, the simulation system stops running, so that the fault tolerance and the robustness are low.

In a system distributed into multiple nodes, each node is highly autonomous. The nodes may be freely connected with each other to form a new connection unit. Any node may become the center in a certain stage, but the node does not have a mandatory central control function. An Influence between the nodes may form a nonlinear causal relationship through the network. This open, flat and equal system phenomenon or structure is called decentralization.

Generally speaking, in the distributed system, how to design an effectively decentralized time management method that may ensure the time consistency to the greatest extent, thus directly affecting the correctness and the scale of the whole distributed system, is one of difficult problems in the field of the distributed computer systems.

SUMMARY

Objective of the present invention: to solve the problem of low time consistency for the distributed simulation system in the prior art, the present invention provides a time consistency synchronization method for distributed simulation.

Technical solutions: a time consistency synchronization method for distributed simulation includes the following steps of:
(1) setting system parameters of each simulation node in a virtual simulation system to zero, wherein the system parameters include a local logic clock, a global logic clock, a local minimum advance clock interval, a global minimum advance clock interval, and a logic clock list of other simulation nodes, and setting the local minimum advance clock interval;
(2) connecting each simulation node with other simulation nodes in a network, determining a master clock, and setting the other simulation nodes as slave clocks;
(3) constructing, by each slave clock, a logic time state query packet, and pushing the logic time state query packet to the master clock; receiving, by the slave clock, A query response packet answered by the master clock, wherein the query response packet includes a global logic clock of the master clock, a local logic clock of other simulation nodes, and a local minimum advance clock interval; and setting, by the slave clock, a global logic clock of the slave clock and a local logic clock to the global logic clock in the query response packet;
(4) packing, by each slave clock, the local logic clock into a data packet and transmitting the packet to a receiving queue of the other simulation nodes through a network communication worker thread, selecting, by the other simulation nodes, one data packet from the receiving queue, comparing the local logic clock in the data packet with the local logic clock of those nodes, if the local logic clock in the data packet is less than the local logic clock of the node, discarding the data packet, and returning a logic clock lag response packet to a data packet sender; if the local logic clock in the data packet is greater than or equal to the local logic clock of the node and less than a sum of the local logic time and the local minimum advance clock interval, accepting the data packet; And if the local logic clock in the data packet is great than or equal to the sum of the local logic time and the local minimum advance clock interval, sending the logic time advance request to the master clock; and
(5) after the master clock receives the logic time advance request of the slave clock, comparing the local logic time requested to be advanced by the slave clock with the global logic time of the master clock, and if the former is less than or equal to the latter, returning a response packet allowing successful time advance to the slave clock; if the former is greater than the latter and less than a sum of the global logic time and the global minimum advance clock interval, allowing the time advance; if the local logic time requested to be advanced by the slave clock is greater than the sum of the global logic time and the global minimum advance clock interval, comparing first data of the other simulation nodes with the sum of the global logic time and the global minimum advance clock interval, wherein the first data refers to a sum of the local logic time and the local minimum advance clock interval, if the first data is greater than or equal to the sum of the global logic time and the global minimum advance clock interval, and there is any time advance request blocked, allowing all time advance requests and updating a local logic time list of simulation nodes in the master clock, and setting the global logic time to a minimum local logic time in all simulation nodes.

Further, in step (2), a method for establishing the connection includes:
sending, by a first simulation node, a detection packet by broadcasting to query the other simulation nodes in the network;
after receiving the detection packet, constructing, by the other simulation nodes, a response packet, establishing a TCP connection with the first simulation node, and transmitting the response packet back to the first simulation node, wherein the response packet includes a network address and a network connection list; and
after receiving the response packet, comparing, by the first simulation node, the network connection list in the response packet with a local network connection list, if the two are inconsistent in contents, constructing a network information difference packet, and transmitting the network information difference packet to the simulation node sending the response packet by using the network address to complete the connection establishment.

Further in step (2), a method for determining the master clock includes:

setting, by each simulation node, the simulation node as the master clock first, and informing the other simulation nodes, if the master clock already exists in the network at the moment, informing, by the master clock, the simulation node, changing, by the simulation node, the simulation node into the slave clock, and executing step (3); if the master clock does not exist in the network at the moment, entering a stage of voting to select the master clock, and judging, by the simulation node, whether the current node is the selected master clock or not; if the answer is yes, setting the current node as the master clock; and otherwise, setting the current node as the slave clock.

Further, in step (2), a method for selecting the master clock by voting includes:

(a) constructing, by each simulation node, an internal vote, wherein the internal vote includes a node identification code and a global logic clock;

(b) putting the internal votes in a sending queue and sending the votes to the other simulation nodes to serve as external votes for the other simulation nodes to obtain from the receiving queue;

(c) obtaining, by the simulation node, the external votes from the receiving queue without an interval;

(d) after the simulation node obtains all the external votes connected by the network, counting the external votes;

(e) selecting a vote with a maximum global logic clock value, judging if a number of the selected votes is greater than or equal to two, and if the number of selected votes is greater than or equal to 2, selecting the vote with the maximum node identification code, and discarding the rest votes;

(f) changing the internal vote of the node into the selected external vote, putting the changed internal vote into the sending queue and sending the changed vote to the other simulation nodes;

(g) obtaining, by the simulation node, a second round of external votes from the receiving queue without an interval;

(h) after the simulation node obtains all the external votes connected by the network, counting the external votes; and (i) judging whether more than a half of the simulation nodes accept the external vote of the node or not, and if more than a half of the simulation nodes accept the external vote of the node, selecting the node as the master clock; otherwise, returning to step (a) to carry out selection again.

Further, in step (3), data between the master clock and the slave clock are all transmitted through the network communication working thread, and the network communication worker thread which comprise a sending queue and the receiving queue; data packets sent by the simulation node to the other simulation nodes are pushed to the sending queue in sequence; and the receiving queue stores data packets sent by the other simulation nodes according to a network receiving sequence.

Further, in step (1), the local logic clock represents the system logic time of the current simulation node; the local minimum advance clock interval represents the minimum interval between each two time advance requests of the current simulation node; the global logic clock represents the global minimum local logic clock of all the simulation nodes; and the global minimum advance clock interval represents the minimum value of a logic time advance interval in the current simulation node.

Further, in step (d), if the simulation node is unable to obtain the external votes of the other simulation nodes, the node tries to re-establish a network connection with the other simulation nodes, and sends and receives again after the connection is successful.

Further, a network connection of a simulation node with the other nodes is monitored regularly by a Ping-Pong mechanism by using a network connection monitoring working thread.

Further, at least two simulation nodes are contained in the virtual simulation experiment system, and all the simulation nodes are peer to each other.

Beneficial effects: Compared with the prior art, the time consistency synchronization method for distributed simulation provided by the present invention selects the most suitable master clock according to the vote, and then uses the master clock to control the other clocks in the network to be synchronized, so as to ensure time logic consistency of data and time-related events of each node; even if a certain simulation node was down, the simulation node has less influence on other links of the whole system, so that effective decentralization can be implemented, a time consistency can be ensured to the greatest extent, and correctness and scale of the whole distributed system are ensured.

DETAILED DESCRIPTION

The present invention is further described hereinafter with reference to the accompanying drawings and the specific embodiments.

In the embodiment, a master clock controls other clocks in a network, which are namely slave clocks, to be synchronized. Clock control information is exchanged between the master clock and other local slave clocks to synchronize the local slave clocks with the master clock. The exchanged clock control information includes: an Identification Code of the slave clock; the current logic time of the slave clock; a minimum logic time advance amount of the slave clock; a logic time that the slave clock tried to advance to, the response information of the master clock after receiving a time advance request of the slave clock; and the Vote information for selecting the master clock in case the current master clock is down.

Figure 1:
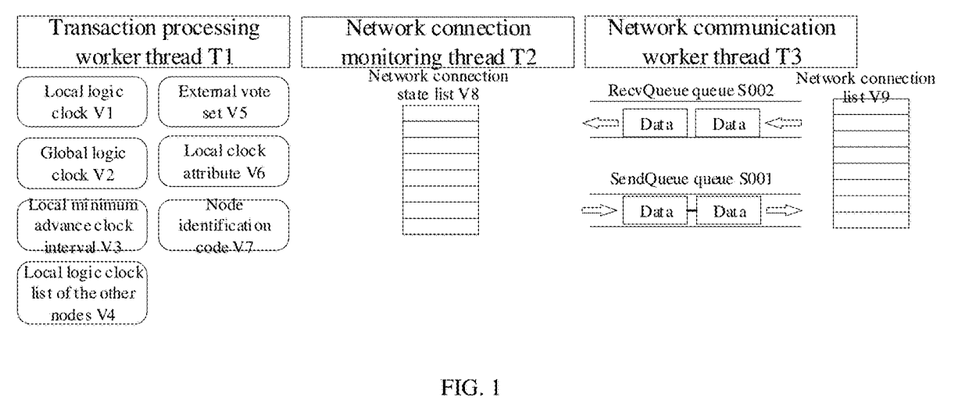
FIG. 1 is a schematic diagram showing composition of the worker threads of a simulation node.

As shown in FIG. 1, a simulation node includes three worker threads, including: a transaction processing worker thread T1, a network connection monitoring thread T2, and a network communication worker thread T3. The network communication worker thread includes two message queues: a SendQueue queue S001 and a RecvQueue queue S002. Data packets sent by the simulation node to the other simulation nodes are pushed to the SendQueue queue in sequence; and the RecvQueue queue stores data packets sent by the other simulation nodes according to a network receiving sequence. The transaction processing worker thread T1 runs the time synchronization algorithm code which includes: a local logic clock V1, a global logic clock V2, a local minimum advance clock interval V3, a local logic clock list V4 of the other nodes, and an external vote set V5. The local logic clock V1 represents a system logic time of the current simulation node. The local minimum advance clock interval V3 represents the minimum interval between each two time advance requests of the current simulation node. The global logic clock V2 represents the global minimum local logic clock of all the simulation nodes, so the local logic clocks of all nodes are usually greater than or equal to the global logic clock V2. The global minimum advance clock interval refers to the minimum value of a logic time advance interval in the current simulation node. A network connection of a simulation node with the other nodes is monitored regularly by a Ping-Pong mechanism by using the network connection monitoring working thread.

A time consistency synchronization algorithm for distributed simulation includes the following steps.

(1) A virtual simulation experiment system contains n(n≥2) simulation nodes, and all simulation nodes are in an equal position, and each simulation node may play the role of the master clock or a slave clock. System parameters of each simulation node in a virtual simulation system are set to zero first, wherein the system parameters include a local logic clock, a global logic clock, a local minimum advance clock interval, a global minimum advance clock interval, and a logic clock list of other simulation nodes, And the local minimum advance clock interval is set.

The local logic clock represents the system logic time of the current simulation node; the local minimum advance clock interval represents the minimum interval between each two time advance requests of the current simulation node; the global logic clock represents the global minimum local logic clock of all the simulation nodes; and the global minimum advance clock interval represents the minimum value of a logic time advance interval in the current simulation node.

(2) Each simulation node is connected with other simulation nodes in a network, The master clock is determined, and the other simulation nodes are set as the slave clocks.

Figure 2:
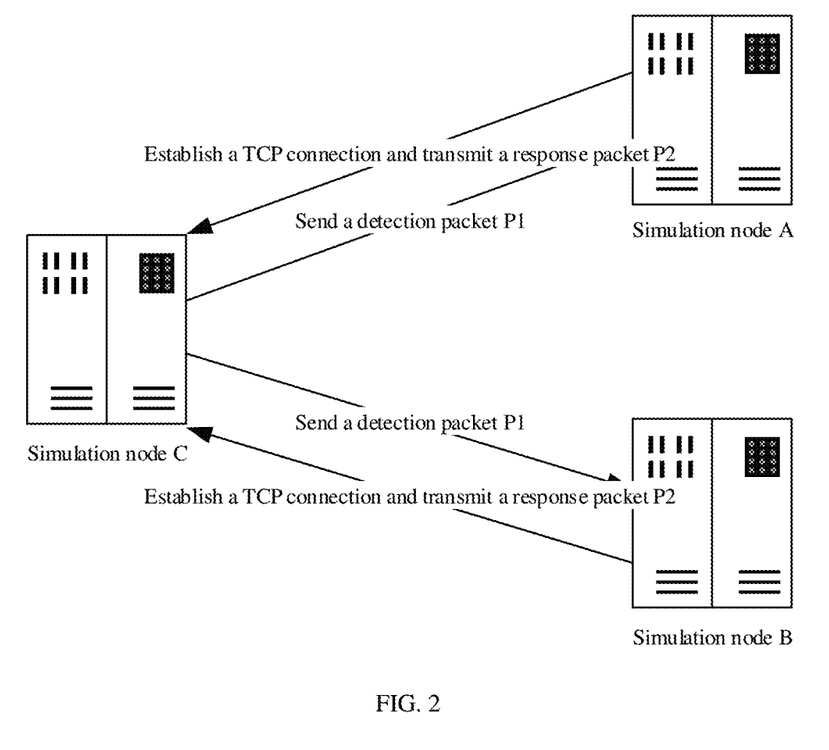
FIG. 2 is a schematic diagram showing signal transmission process during connection of the simulation nodes.

As shown in FIG. 2, a method for establishing the connection between the simulation nodes is as follows.

Figure 3:
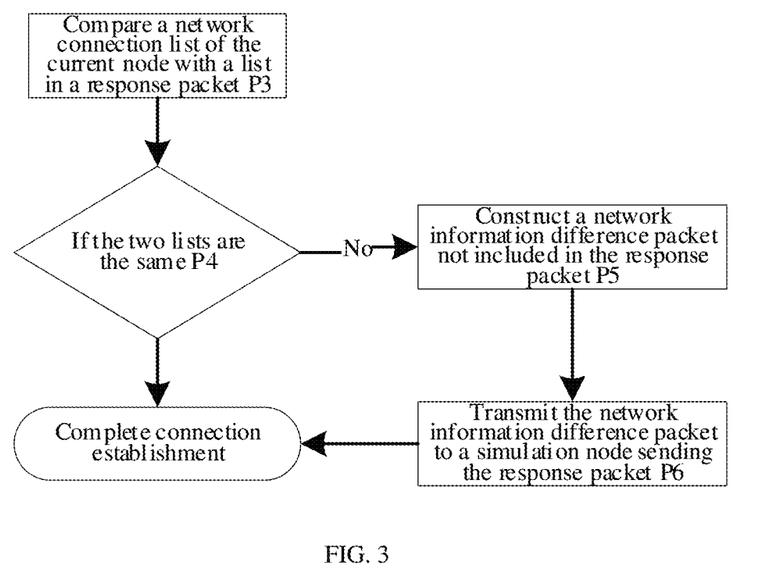
FIG. 3 is a schematic diagram showing information comparison procedure during connection establishment of the simulation nodes.

After a simulation node C is started, a detection packet P1 is sent by broadcasting to query the other simulation nodes in the current computer network. When simulation nodes A and B in the network receive the detection packet (P1), a network address and a network connection list V9 are encapsulated as a response packet. A TCP connection is established with the simulation node C, and the response packet is transmitted (P2). After the simulation node C receives the response packet, as shown in FIG. 3, the network connection list V9 of the node is compared with the network connection list in the response packet (P3). If the two network connection lists are inconsistent in contents, a network information difference packet is constructed (P5), and the network information difference packet is transmitted to the simulation node which sends the response packet (P6) to complete the connection establishment.

A method for determining the master clock is as follows.

The simulation node is set as the master clock by each simulation node first, and the other simulation nodes are informed, if the master clock already exists in the network at the moment, the simulation node is informed by the master clock, the simulation node is changed into the slave clock by the simulation node, and step (3) is executed. If the master clock does not exist in the network at the moment, a stage of selecting a master clock by voting is entered to select the master clock, and whether the current node is the selected master clock or not is judged by each simulation node, if the current node is the selected master clock, the current node is set as the master clock. Otherwise, the current node is set as the slave clock.

Figure 4:
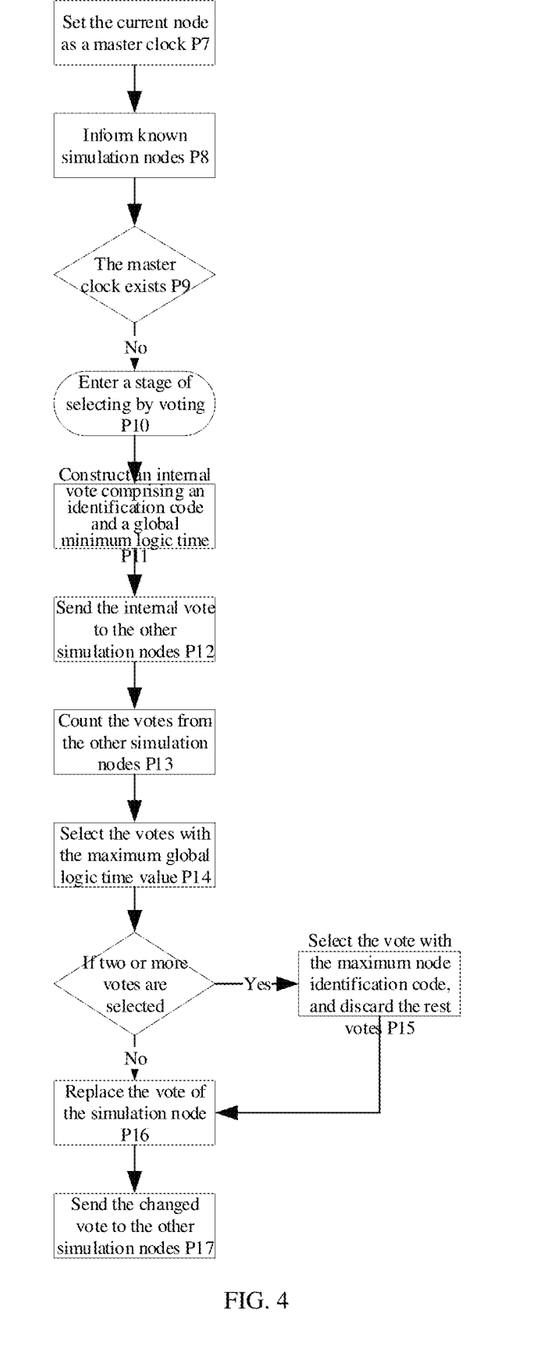
FIG. 4 is a flowchart of selecting a master clock by voting.

A method for selecting the master clock by voting is shown in FIG. 4, including:

(a) constructing, by each simulation node, an internal vote, wherein the internal vote includes a node identification code and a global logic clock;

(b) putting the internal votes in a sending queue and sending the votes to the other simulation nodes to serve as external votes for the other simulation nodes to obtain from the receiving queue;

(c) obtaining, by the simulation node, the external votes from the receiving queue without an interval;

(d) after the simulation node obtains all the external votes connected by the network, counting the external votes; if the simulation node is unable to obtain the external votes of the other simulation nodes, trying to re-establish a network connection with the other simulation nodes, and sending and receiving again after the connection is successful;

(e) selecting a vote with a maximum global logic clock value, judging if a number of the selected votes is greater than or equal to two, and if the number of selected votes is greater than or equal to 2, selecting the vote with the maximum node identification code, and discarding the rest votes;

(f) changing the internal vote of the node into the selected external vote, putting the changed internal vote into the sending queue and sending the changed vote to the other simulation nodes;

(g) obtaining, by the simulation node, a second round of external votes from the receiving queue without an interval;

(h) after the simulation node obtains all the external votes connected by the network, counting the external votes; and (i) judging whether more than a half of the simulation nodes accept the external vote of the node or not, and if more than a half of the simulation nodes accept the external vote of the node, selecting the node as the master clock; otherwise, returning to step (a) to carry out selection again.

If it is determined that the voting is terminated, the simulation node first judges whether the current node is the master clock currently accepted by the votes of more than a half of the simulation nodes or not, if the current node is the master clock currently accepted by the votes of more than a half of the simulation nodes, the current node is set as the master clock; and otherwise, the current node is set as a slave clock.

Figure 5:
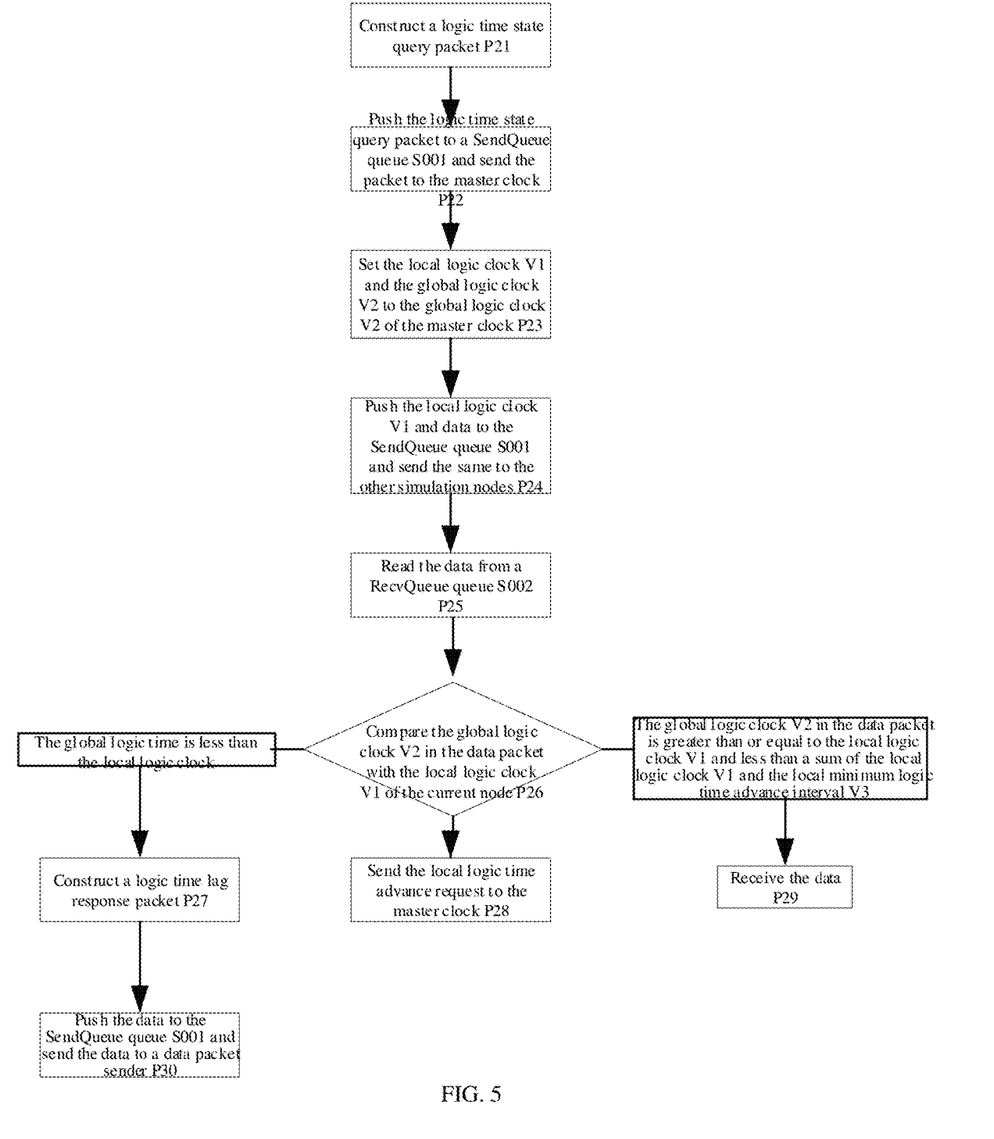
FIG. 5 is an execution flowchart of a slave clock during clock synchronization.

(3) As shown in FIG. 5, a logic time state query packet is constructed by each slave clock, and the logic time state query packet is pushed to the master clock. A query response packet answered by the master clock is received by the slave clock, wherein the query response packet includes a global logic clock of the master clock, a local logic clock of the other simulation nodes, and a local minimum advance clock interval. After the slave clock receives the query response packet, both a global logic clock and a local logic clock of the slave clock are set to the global logic clock in the query response packet by the slave clock.

Data between the master clock and the slave clock are all transmitted through the network communication worker thread which includes the sending queue and the receiving queue. Data packets sent by the simulation node to the other simulation nodes are pushed to the sending queue in sequence. The receiving queue stores data packets sent by the other simulation nodes according to a network receiving sequence.

(4) As shown in FIG. 5, the local logic clock is packed into a data packet by each slave clock and transmitted to a receiving queue of the other simulation nodes through the network communication working thread, one data packet is selected from the receiving queue by the other simulation nodes, the local logic clock in the data packet is compared with the local logic clock of the other simulation nodes, if the local logic clock in the data packet is less than the local logic clock of the other simulation nodes, the data packet is discarded, and a logic clock lag response packet is returned to a data packet sender. If the local logic clock in the data packet is greater than or equal to the local logic clock of the other simulation nodes and less than a sum of the local logic time and the local minimum advance clock interval, the data packet is accepted. If the local logic clock in the data packet is great than or equal to the sum of the local logic time and the local minimum advance clock interval, the logic time advance request is sent to the master clock.

Figure 6:
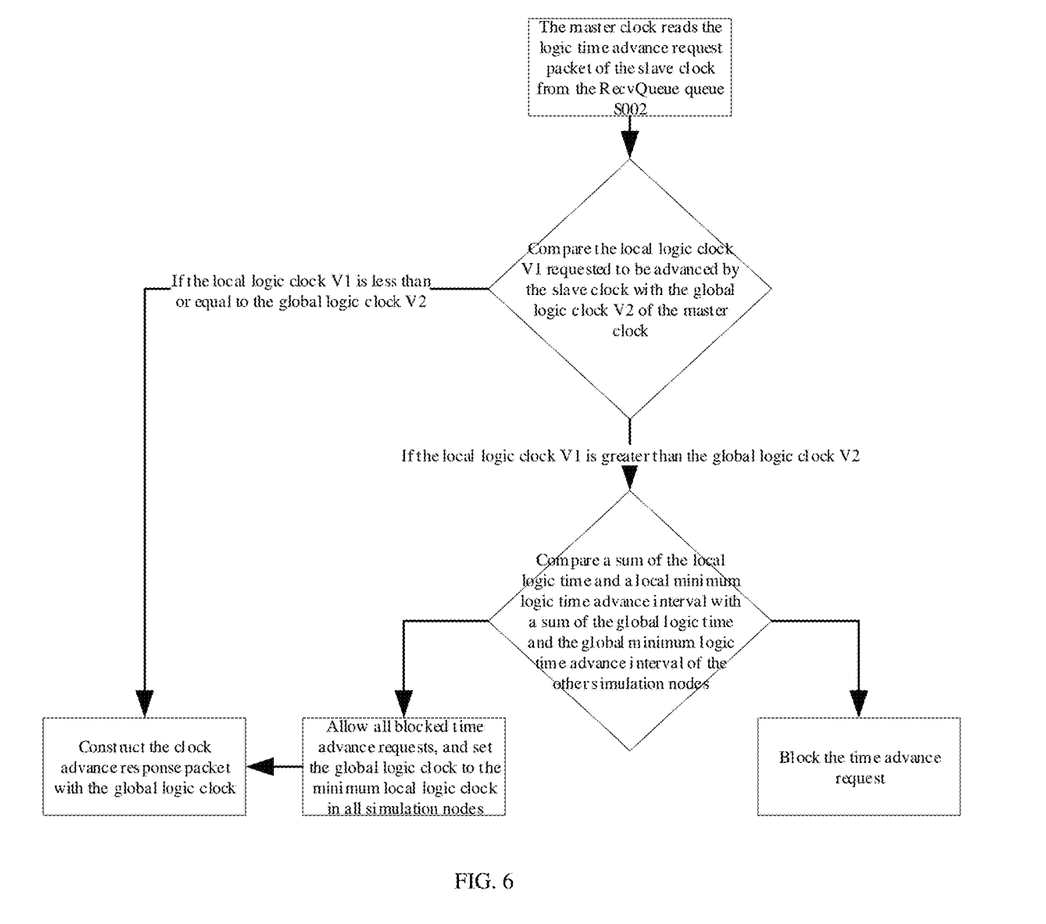
FIG. 6 is an execution flowchart of the master clock during clock synchronization.

(5) As shown in FIG. 6, after the master clock receives the logic time advance request of the slave clock, the local logic time requested to be advanced by the slave clock is compared with the global logic time of the master clock, and if the local logic time requested to be advanced by the slave clock is less than or equal to the global logic time of the master clock, a response packet allowing successful time advance is returned to the slave clock. If the local logic time requested to be advanced by the slave clock is greater than the global logic time, first data of the other simulation nodes is compared with the sum of the global logic time and the global minimum advance clock interval, if the first data is greater than or equal to the sum of the global logic time and the global minimum advance clock interval, and the time advance request is blocked, all time advance requests are allowed and a local logic time list of simulation nodes in the master clock is updated, and the global logic time is set as a minimum local logic time in all simulation nodes.

A network connection of the simulation node with the other nodes is monitored regularly by a Ping-Pong mechanism by using a network connection monitoring working thread.

What is claimed is:

1. A time consistency synchronization method for distributed simulation, comprising the following steps of:
   (1) setting system parameters of each simulation node in a virtual simulation system to zero, wherein the system parameters comprise a local logic clock, a global logic clock, a local minimum advance clock interval, a global minimum advance clock interval, and a logic clock list of other simulation nodes, and setting the local minimum advance clock interval;
   (2) connecting each simulation node with other simulation nodes in a network, determining a master clock, and setting the other simulation nodes as slave clocks;
   (3) constructing, by each slave clock, a logic time state query packet, and pushing the logic time state query packet to the master clock; receiving, by the slave clock, a query response packet answered by the master clock, wherein the query response packet comprises a global logic clock of the master clock, a local logic clock of the other simulation nodes, and a local minimum advance clock interval; and setting, by the slave clock, both a global logic clock and a local logic clock of the slave clock to the global logic clock in the query response packet;
   (4) packing, by each slave clock, the local logic clock into a data packet and transmitting the packet to a receiving queue of the other simulation nodes through a network communication working thread, selecting, by the other simulation nodes, one data packet from the receiving queue, comparing the local logic clock in the data packet with the local logic clock of the other simulation nodes, if the local logic clock in the data packet is less than the local logic clock of the other simulation nodes, discarding the data packet, and returning a logic clock lag response packet to a data packet sender; if the local logic clock in the data packet is greater than or equal to the local logic clock of the other simulation nodes and less than a sum of the local logic time and the local minimum advance clock interval, accepting the data packet; and if the local logic clock in the data packet is great than or equal to the sum of the local logic time and the local minimum advance clock interval, sending the logic time advance request to the master clock; and
   (5) after the master clock receives the logic time advance request of the slave clock, comparing the local logic time requested to be advanced by the slave clock with the global logic time of the master clock, and if the local logic time requested to be advanced by the slave clock is less than or equal to the global logic time of the master clock, returning a response packet allowing successful time advance to the slave clock; if the local logic time requested to be advanced by the slave clock is greater than the global logic time and less than a sum of the global logic time and the global minimum advance clock interval, allowing the time advance; if the local logic time requested to be advanced by the slave clock is greater than the sum of the global logic time and the global minimum advance clock interval, comparing first data of the other simulation nodes with the sum of the global logic time and the global minimum advance clock interval, if the first data is greater than or equal to the sum of the global logic time and the global minimum advance clock interval, and the time advance request is blocked, allowing all time advance requests and updating a local logic time list of simulation nodes in the master clock, and setting the global logic time as a minimum local logic time in all simulation nodes.

2. The time consistency synchronization method for distributed simulation according to claim 1, wherein in step (2), a method for establishing the connection comprises:

sending, by a first simulation node, a detection packet by broadcasting to query the other simulation nodes in the network;

after receiving the detection packet, constructing, by The other simulation nodes, a response packet, establishing a TCP connection with the first simulation node, and transmitting the response packet back to the first simulation node, wherein the response packet comprises a network address and a network connection list; and after receiving the response packet, comparing, by the first simulation node, the network connection list in the response packet with a local network connection list, if the two are inconsistent in contents, constructing a network information difference packet, and transmitting the network information difference packet to the simulation node sending the response packet by using the network address to complete the connection establishment.

3. The time consistency synchronization method for distributed simulation according to claim 1, wherein in step (2), a method for determining the master clock comprises:

setting, by each simulation node, the simulation node as the master clock first, and informing the other simulation nodes, if the master clock already exists in the network at the moment, informing, by the master clock, the simulation node, changing, by the simulation node, the simulation node into the slave clock, and executing step (3); if the master clock does not exist in the network at the moment, entering a stage of voting to select the master clock, and judging, by the simulation node, whether the current node is the selected master clock or not; if the answer is yes, setting the current node as the master clock; and otherwise, setting the current node as the slave clock.

4. The time consistency synchronization method for distributed simulation according to claim 3, wherein in step (2), a method for selecting the master clock by voting comprises:

(a) constructing, by each simulation node, an internal vote, wherein the internal vote comprises a node identification code and a global logic clock;

(b) putting the internal votes in a sending queue and sending the votes to the other simulation nodes to serve as external votes for the other simulation nodes to obtain from the receiving queue;

(c) obtaining, by The simulation node, the external votes from the receiving queue without an interval;

(d) after the simulation node obtains all the external votes connected by the network, counting the external votes;

(e) selecting a vote with a maximum global logic clock value, judging if a number of the selected votes is greater than or equal to two, and if the number of selected votes is greater than or equal to 2, selecting the vote with the maximum node identification code, and discarding the rest votes;

(f) changing the internal vote of the node into the selected external vote, putting the changed internal vote into the sending queue and sending the changed vote to the other simulation nodes;

(g) obtaining, by the simulation node, a second round of external votes from the receiving queue without an interval;

(h) after the simulation node obtains all the external votes connected by the network, counting the external votes; and (i) judging whether more than a half of the simulation nodes accept the external vote of the node or not, and if more than a half of the simulation nodes accept the external vote of the node, selecting the node as the master clock; otherwise, returning to step (a) to carry out selection again.

5. The time consistency synchronization method for distributed simulation according to claim 1, wherein in step (3), data between the master clock and the slave clock are all transmitted through the network communication worker thread which comprises a sending queue and the receiving queue; data packets sent by the simulation node to the other simulation nodes are pushed to the sending queue in sequence; and the receiving queue stores data packets sent by the other simulation nodes according to a network receiving sequence.

6. The time consistency synchronization method for distributed simulation according to claim 1, wherein in step (1), the local logic clock represents a system logic time of a current simulation node; the local minimum advance clock interval represents a minimum interval between each two time advance requests of the current simulation node; the global logic clock represents a global minimum local logic clock of all the simulation nodes; and the global minimum advance clock interval represents a minimum value of a logic time advance interval in the current simulation node.

7. The time consistency synchronization method for distributed simulation according to claim 4, wherein in step (d), if the simulation node is unable to obtain the external votes of the other simulation nodes, the node tries to re-establish a network connection with the other simulation nodes, and sends and receives again after the connection is successful.

8. The time consistency synchronization method for distributed simulation according to claim 7, wherein a network connection of a simulation node with the other nodes is monitored regularly by a Ping-Pong mechanism by using a network connection monitoring working thread.

9. The time consistency synchronization method for distributed simulation according to claim 1, wherein at least two simulation nodes are contained in the virtual simulation experiment system, and all the simulation nodes are peer to each other.

* * * * *